US011740825B2

(12) United States Patent
Bolen et al.

(10) Patent No.: US 11,740,825 B2
(45) Date of Patent: Aug. 29, 2023

(54) OBJECT LIFECYCLE MANAGEMENT IN A DISPERSED STORAGE SYSTEM

(71) Applicant: INTERNATIONAL BUSINESS MACHINES CORPORATION, Armonk, NY (US)

(72) Inventors: David Brittain Bolen, Chicago, IL (US); Kevin Michael Freese, Chicago, IL (US); Thomas Dubucq, Chicago, IL (US); Akila Srinivasan, Carpentersville, IL (US); Wesley Leggette, Chicago, IL (US); Vivek Bajpai, Dekalb, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/741,924

(22) Filed: Jan. 14, 2020

(65) Prior Publication Data
US 2021/0216233 A1    Jul. 15, 2021

(51) Int. Cl.
*G06F 3/06* (2006.01)
*G06F 16/22* (2019.01)

(52) U.S. Cl.
CPC ............ *G06F 3/0649* (2013.01); *G06F 3/067* (2013.01); *G06F 3/0616* (2013.01); *G06F 3/0644* (2013.01); *G06F 3/0652* (2013.01); *G06F 16/2246* (2019.01)

(58) Field of Classification Search
CPC .. G06F 3/0649; G06F 16/2246; G06F 3/0616; G06F 3/0644; G06F 3/0652; G06F 3/067
See application file for complete search history.

(56) References Cited

U.S. PATENT DOCUMENTS

| | | | |
|---|---|---|---|
| 9,280,318 | B2 | 3/2016 | Du et al. |
| 9,311,381 | B2 | 4/2016 | Milousheff et al. |
| 9,781,207 | B2 | 10/2017 | Shirley, Jr. et al. |
| 9,900,275 | B2 | 2/2018 | Nielsen et al. |
| 9,984,090 | B1 | 5/2018 | Shang et al. |
| 10,025,568 | B2 | 7/2018 | Mayer et al. |
| 10,176,237 | B2 | 1/2019 | Nadgir et al. |

(Continued)

OTHER PUBLICATIONS

List of IBM Patents or Patent Applications Treated as Related, dated Jan. 15, 2020, 1 page.

(Continued)

*Primary Examiner* — Ryan Bertram
*Assistant Examiner* — Eric T Loonan
(74) *Attorney, Agent, or Firm* — Randy Emilio Tejeda; Andrew D. Wright; Calderon Safran & Cole P.C.

(57) ABSTRACT

A method includes: identifying, by a first program module, a bucket having an object lifecycle management rule in a dispersed storage network; creating, by a second program module, ranges of object names included in a namespace of the bucket; determining, by a third program module and for respective objects in each of the ranges, whether the respective objects satisfy the object lifecycle management rule of the bucket; and performing, by a fourth program module and based on the determining, an action on one of the respective objects that satisfies the object lifecycle management rule, the action being defined by the object lifecycle management rule.

20 Claims, 7 Drawing Sheets

(56) References Cited

U.S. PATENT DOCUMENTS

| | | |
|---|---|---|
| 2012/0159511 A1* | 6/2012 | Buesing ........... G06Q 10/06316 718/106 |
| 2013/0232152 A1 | 9/2013 | Dhuse et al. |
| 2013/0304745 A1 | 11/2013 | Dhuse et al. |
| 2014/0074899 A1 | 3/2014 | Halevy et al. |
| 2014/0173080 A1 | 6/2014 | Dilmaghani et al. |
| 2015/0234845 A1 | 8/2015 | Moore et al. |
| 2015/0347187 A1* | 12/2015 | Panda ................... G06F 9/5027 718/102 |
| 2016/0088034 A1 | 3/2016 | Martens et al. |
| 2017/0091035 A1 | 3/2017 | Kazi et al. |
| 2017/0123848 A1* | 5/2017 | Borich ................... G06F 3/067 |
| 2017/0123976 A1 | 5/2017 | Motwani |
| 2017/0193023 A1 | 7/2017 | Dhuse et al. |
| 2017/0255589 A1* | 9/2017 | Barber ................ G06F 16/2474 |
| 2017/0286465 A1 | 10/2017 | Venkatesh et al. |
| 2017/0337154 A1 | 11/2017 | Barber et al. |
| 2018/0074903 A1 | 3/2018 | Leggette et al. |
| 2018/0205552 A1 | 7/2018 | Struttmann et al. |
| 2018/0253443 A1 | 9/2018 | Marwah et al. |
| 2018/0307719 A1 | 10/2018 | Mandagere et al. |
| 2018/0314706 A1 | 11/2018 | Sirton et al. |
| 2018/0314718 A1 | 11/2018 | Fernandez et al. |
| 2018/0356989 A1* | 12/2018 | Meister ............... G06F 11/3409 |
| 2019/0163572 A1 | 5/2019 | Dhuse et al. |
| 2019/0179805 A1 | 6/2019 | Prahlad et al. |
| 2020/0174671 A1* | 6/2020 | Margaglia ........... G06F 11/1076 |

OTHER PUBLICATIONS

Meier et al., "Abstracting Event-Driven Systems With Lifestate Rules", Cornell University Library, Dec. 31, 2016, 15 pages.

Simonet et al., "Active Data: A Programming Model To Manage Data Life Cycle Across Heterogeneous Systems And Infrastructures", HAL archived-ouvertes, Future Generation Computer Systems, Apr. 22, 2015, 50 pages.

El Arass et al., "Data Lifecycle: From Big Data To Smart Data", CIST IEEE 5th International Congress On, Oct. 21-27, 2018, 9 pages.

Steinau et al., "A Modeling Tool For PHILharmonicFlows Objects And Lifecycle Processes", Institute of Databases and Information Systems, Ulm University, Germany, BPMD'17 DBIS EPub BPM Demo Session, Sep. 12-14, 2017, 5 pages.

Mell et al., "The NIST Definition of Cloud Computing", NIST, Special Publication 800-145, Sep. 2011, 7 pages.

Anonymous, "B+ tree", Wikipedia, https://en.wikipedia.org/wiki/B%2B_tree, accessed Nov. 4, 2019, 6 pages.

Anonymous, "B-tree", Wikipedia, https://en.wikipedia.org/wiki/B-tree, accessed Nov. 4, 2019, 13 pages.

Leonard, "IBM Cloud Object Storage Concepts and Architecture System Edition", Redbooks, May 2019, 34 pages.

Office Action dated Apr. 15, 2022 in related U.S. Appl. No. 16/742,180, 32 pages.

Office Action dated Nov. 14, 2022 in related U.S. Appl. No. 16/742,180, 37 pages.

* cited by examiner

OBJECT LIFECYCLE MANAGEMENT IN A DISPERSED STORAGE SYSTEM

BACKGROUND

Aspects of the present invention relate generally to processing work items in dispersed storage systems and, more particularly, to systems and methods for performing object lifecycle management in a dispersed storage system.

Computing devices communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

A computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop® is an open source software framework that supports distributed applications enabling application execution by thousands of computers.

In addition to cloud computing, a computer may use "cloud storage" as part of its memory system. Cloud storage enables a user, via its computer, to store files, applications, etc., on an Internet storage system. The Internet storage system may include a RAID (redundant array of independent disks) system and/or a dispersed storage system that uses an error correction scheme to encode data for storage.

SUMMARY

In a first aspect of the invention, there is a computer-implemented method including: identifying, by a first program module, a bucket having an object lifecycle management rule in a dispersed storage network; creating, by a second program module, ranges of object names included in a namespace of the bucket; determining, by a third program module and for respective objects in each of the ranges, whether the respective objects satisfy the object lifecycle management rule of the bucket; and performing, by a fourth program module and based on the determining, an action on one of the respective objects that satisfies the object lifecycle management rule, the action being defined by the object lifecycle management rule.

In another aspect of the invention, there is a computer program product comprising one or more computer readable storage media having program instructions collectively stored on the one or more computer readable storage media, the program instructions executable to: generate a first leasable index comprising first work items, wherein the generating is based on identifying buckets that are in a dispersed storage network and that have an object lifecycle management rule; generate a second leasable index comprising second work items, each including a name of one of the identified buckets and a range of object names in the one of the identified buckets; generate a third leasable index comprising third work items, each including a name of an object, from a respective one of the identified buckets, wherein the object satisfies the object lifecycle management rule of the respective one of the identified buckets; and for respective ones of the third work items, perform an action on the object named in the respective one of the third work items, the action being defined by the object lifecycle management rule of the respective one of the identified buckets.

In another aspect of the invention, there is system including a dispersed storage processing unit in a dispersed storage network, the dispersed storage processing unit comprising a processor, a computer readable memory, and one or more computer readable storage media. The system includes: program instructions to identify a bucket having an object lifecycle management rule in the dispersed storage network; program instructions to create ranges of object names included in a namespace of the bucket; program instructions to compare, for each object in each of the ranges, object metadata to the object lifecycle management rule of the bucket; and program instructions to perform, based on the comparing, an action on one of the objects that satisfies the object lifecycle management rule, the action being defined by the object lifecycle management rule. The program instructions are collectively stored on the one or more computer readable storage media for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
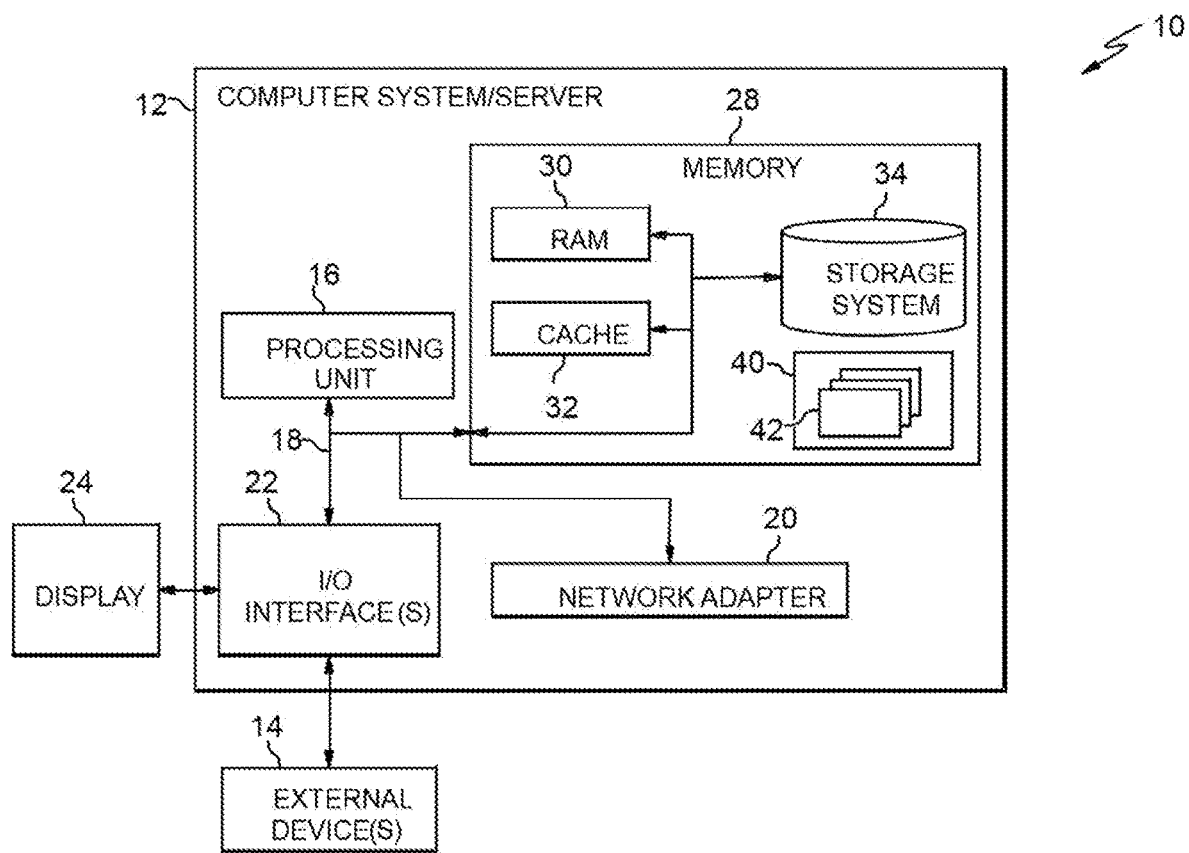
FIG. 1 depicts a cloud computing node according to an embodiment of the present invention.

Aspects of the present invention relate generally to processing work items in dispersed storage systems and, more particularly, to systems and methods for performing object lifecycle management in a dispersed storage system. Aspects of the invention provide for the process of managing the lifecycle of objects in a DSN memory using background processing and the Producer Consumer Schedule Framework to asynchronously discover and process objects in a distributed manner.

A user may wish to have a DSN manage the lifecycle of their data for them. For example the user may want to configure the DSN to remove data that has reached a certain age, or to remove data after a certain date. As another example, rather than remove data, the user may wish to move the data to a lower cost, or lower performance, storage media. According to aspects of the invention, a DSN may be organized into multiple buckets, each of which may have different object lifecycle management rules. In embodiments, a user may define one or more object lifecycle management rules for a bucket containing the user's data objects.

In accordance with aspects of the invention, a DSN has a generalized mechanism referred to as the Producer Consumer Schedule Framework (PCSF) that is configured to perform background work in dispersed storage systems. This system is utilized to create a series of producer/consumer/scheduler bundles that are configured to implement support for object lifecycle management in the background of a DSN, e.g., according to the user-defined object lifecycle management rules that are associated with buckets in the DSN.

According to aspects of the invention, an object lifecycle management functionality (e.g., such as expiration) is broken down into two major components, one in an API (e.g., front-end) half and another in the reclamation (e.g., back-end) half. In embodiments, the API half implements an API that allows users to configure object lifecycle management rules for their bucket that tells the system to perform various actions on their data objects (in that bucket) when various preconditions have occurred. Preconditions can include matching name prefixes or suffixes, the object being over a defined age, a calendar date has been reached, the object was created during a specific date range, the amount of space being utilized has reached a threshold, or other possible scenarios based on the object and bucket metadata.

In embodiments, the back-end half of the system uses the rules the user has defined, object and bucket metadata, and a collection of PCSF bundles to implement the actions defined in the rules. Actions can include, but are not limited to, deleting an object, moving the object to a different storage system, or moving the object to a different storage medium within the DSN memory.

In accordance with aspects described herein, the system uses PCSF bundles to implement object lifecycle management by creating a series of bundles that find objects to process and then a set of bundles, one per lifecycle operation, to carry out the actions. In one exemplary implementation, the first PCSF bundle scans the list of buckets in the DSN memory for buckets that have actionable lifecycle policies. An actionable policy is one where there is a possibility of finding some object based on the policy that needs to be acted upon. Examples of non-actionable policies could include policies that do not come into effect until a point in the future, policies based on the age of the object when the age of the bucket has not yet reached that age, and policies that only take effect at a certain level of storage utilization. The producer of this first bundle takes the list of buckets, filters it, and the resulting set of buckets are passed to the consumer which writes them as work items into a queue controlled by the next PCSF bundle.

In this exemplary implementation, the next step in the process finds objects in the relevant buckets that are to be acted upon based on the bucket's lifecycle policy. One embodiment of a PCSF bundle utilizes metadata stored in DSN memory that keeps a list of when each object needs to be acted upon, e.g., with the producer of this bundle efficiently reading the list, which could be sorted by the date upon which an action is due, and selecting the objects that are due. The producer passes these object names to the consumer of this PCSF bundle, which writes the object name into the queue of the appropriate action PCSF bundle.

Another method includes scanning DSN metadata that is maintained about the objects. In this example, the PCSF bundle first divides the bucket into work items representing ranges of object names of approximately equal size. These scanning ranges are then written into a queue that is processed by another PCSF bundle. In this example, the next PCSF bundle takes the scanning ranges, reads the object metadata for the objects in the given range and, for each object that needs to be acted upon (e.g. object whose metadata satisfies the bucket rule), writes the object name into the queue of the appropriate PCSF action bundle.

With continued reference to this exemplary implementation, the PCSF action bundles process their work items and apply the appropriate action to the objects. Because these scanning processes may take some time, in some embodiments the action bundles revalidate the object against the bucket rule(s) to ensure that the user has not changed the rules.

These processes may take significant time to execute. Accordingly, in embodiments, the system is configured such that the processes run in parallel with one another by allowing each PCSF bundle to start processing work before the predecessor is completely finished. For example the action bundles can start processing work as soon as the scanning bundles have identified it. This parallel processing makes the system more efficient.

In some implementations of a DSN, when offering object lifecycle management as a service to an end user, there are statements about exactly when rules will go into effect and how long it will take to complete the processing. In order to ensure the highest likelihood of completing the actions in the stated time, an embodiment of the invention organizes the PCSF bundles such that the scanning bundles run one day in advance of the actions bundles, identifying work to be acted upon on the next day. By including the date at which the action should occur in the work item, the action bundles are configured to only process the work that is ready. A further optimization in this case is a configurable amount of time where the scanning bundles skip work that should have already been discovered (e.g., work which may be pending in the queues of the action bundles). This optimization eliminates adding duplicate work to the action bundle queues.

By using parallel PCSF bundles in accordance with aspects described herein, object lifecycle management can be implemented as a set of background processes that are distributed across a DSN memory. In this manner, implementations of the invention provide a method for object life cycle management in a dispersed storage network (DSN), the method comprising the steps of: organizing the DSN into a plurality of buckets having differing object life cycle rules; monitoring background tasks in the DSN memory via a producer consumer schedule framework (PCSF); creating, via the PCSF, a series of PCSF bundles for supporting object life cycle management in the background of the DSN memory; and applying via the PCSF bundles to the DSN memory.

Aspects of the invention improve the functioning of a computer system by increasing the efficiency of the system. In particular, aspects of the invention improve the efficiency of a DSN by performing object lifecycle management tasks in parallel, which increases the speed at which the object lifecycle management for the entire system is performed. Aspects of the invention also generate new data that does not previously exist (e.g., work items), and use this new data in subsequent steps (e.g., adding the work items to a leasable index from which the work items are leased by DSN nodes to perform object lifecycle management tasks using the work items). Aspects of the invention also have the practical application of managing user data in a DSN in accordance with rules defined by the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
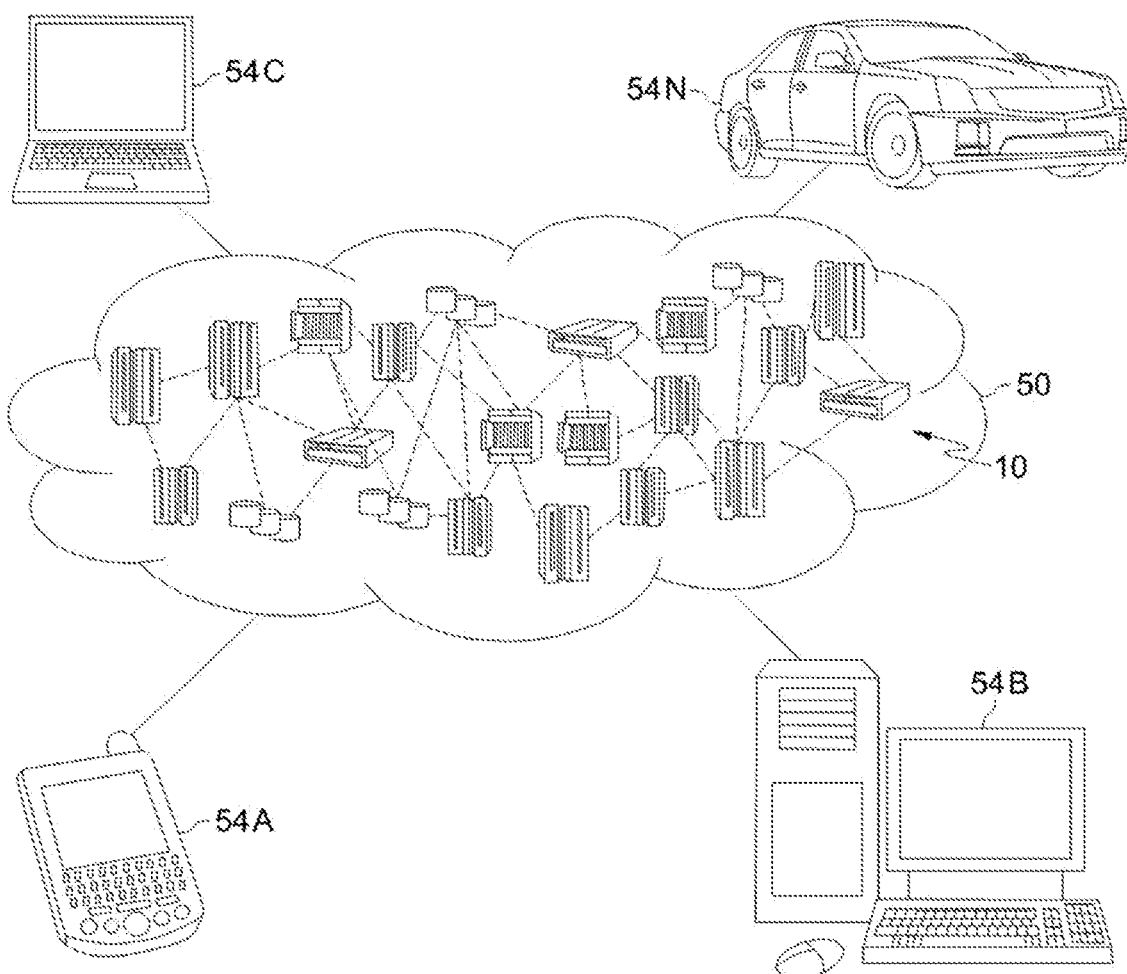
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
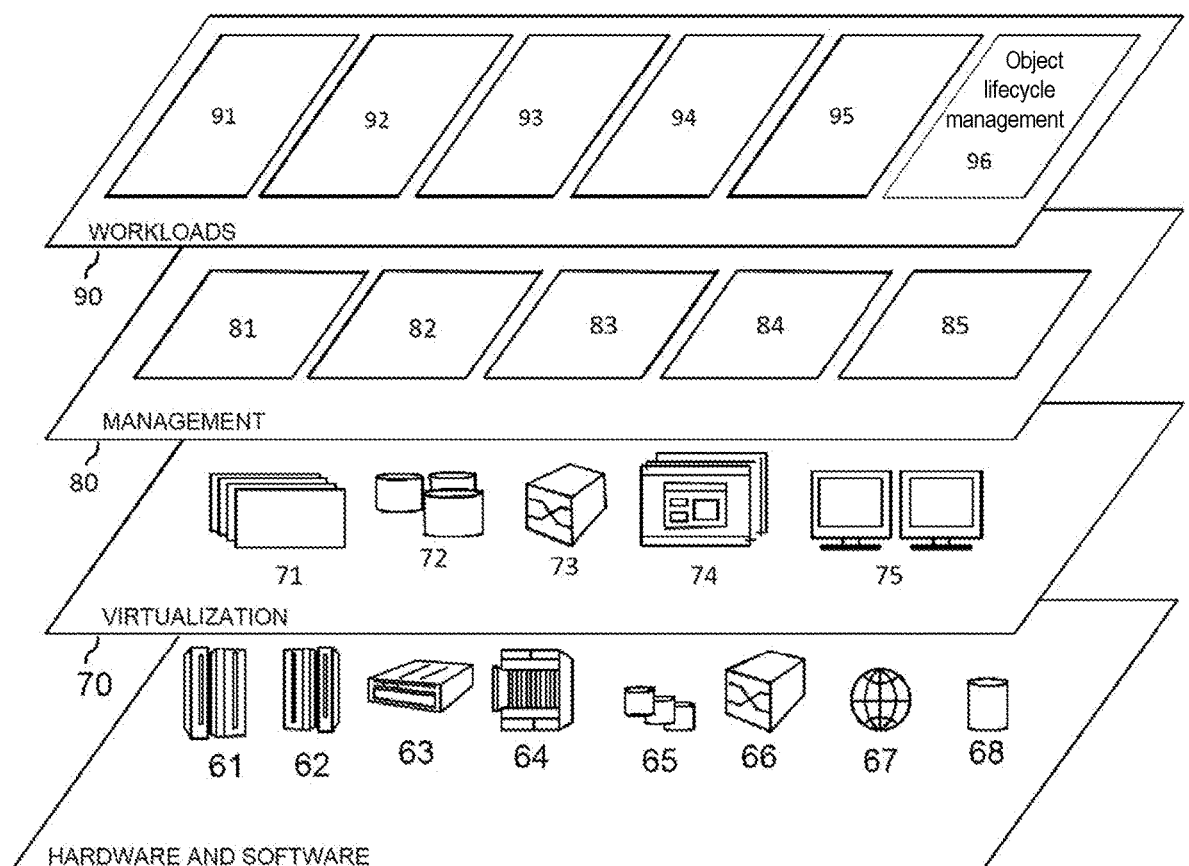
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object lifecycle management 96.

Implementations of the invention may include a computer system/server 12 of FIG. 1 in which one or more of the program modules 42 are configured to perform (or cause the computer system/server 12 to perform) one of more functions of the object lifecycle management 96 of FIG. 3. For example, the one or more of the program modules 42 may be configured to: (i) identify all the buckets within a vault that have a rule, and generate a first leasable index including work items corresponding to these buckets; (ii) for each work item in the first leasable index, divide the namespace of the bucket into ranges of object names of approximately equal size, and add these ranges as work items to a second leasable index; (iii) for each work item in the second leasable index, analyze the object metadata of each object in the range to identify objects that satisfy the rule associated with this bucket, and add the identified objects as work items to a third leasable index; and (iv) for each work item in the third leasable index, perform the action specified by the rule associated with this bucket on the object of this work item.

Figure 4:
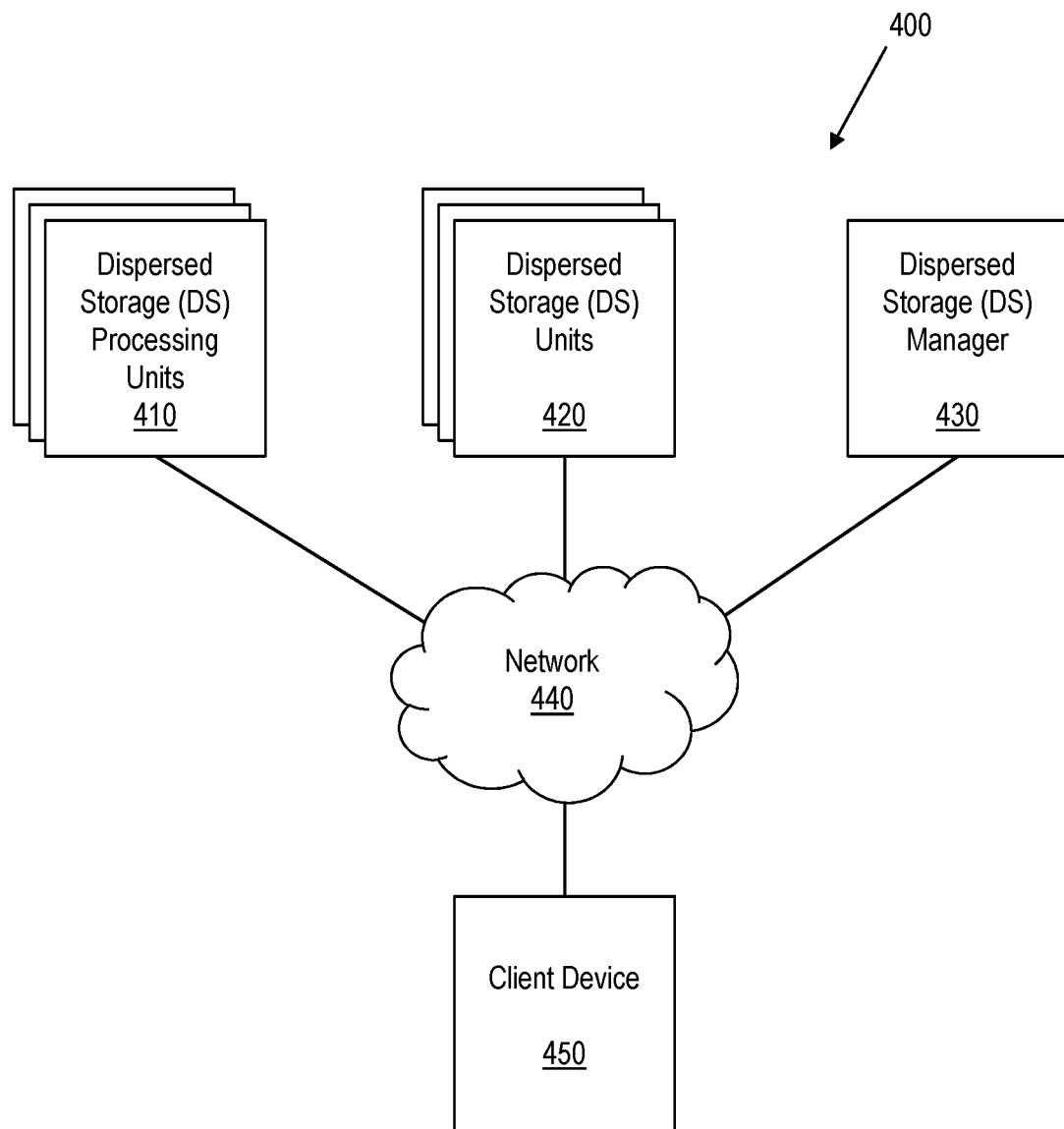
FIG. 4 shows a dispersed storage network (DSN) in accordance with aspects of the invention.

FIG. 4 shows a dispersed storage network 400 (DSN) in accordance with aspects of the invention. In embodiments, the DSN 400 comprises plural dispersed storage processing units 410 (DS processing units), plural dispersed storage units 420 (DS units), and at least one dispersed storage manager 430 (DS manager). The DS processing units 410, the DS units 420, and the DS manager 430 all communicate via a network 440, which comprises one or more computer networks such as a LAN, WAN, and the Internet. In a cloud implementation, the network 440 is a cloud computing environment 50 of FIG. 2, and the DS processing units 410, the DS units 420, and the DS manager 430 are each nodes 10 in the cloud computing environment 50.

In accordance with aspects of the invention, the DSN 400 stores data using object storage technology, which uses Information Dispersal Algorithms (IDAs) to separate a data object into slices that are distributed to plural ones of the DS units 420. As used herein, a slice is a dispersed piece of encoded data. Slices are created from an original data object and can be used to recreate the original data object. In particular, the DSN 400 creates slices using a combination of erasure coding, encryption, and dispersal algorithms. The erasure coding generates 'extra' slices for each data object, such that the data object can be recreated from a subset (less than all of) the total number of slices that are stored for this data object. By dividing a data object into slices and storing the slices at plural different DS units 420, the DSN 400 ensures that no single one of the DS units 420 has all the slices that are necessary to recreate the data object. Moreover, by creating extra slices for each data object, the DSN 400 can tolerate multiple failures without losing the ability to recreate the original data object, e.g., from the available slices.

According to aspects of the invention, the DS manager 430 provides a management interface that is used for system administrative tasks, such as system configuration, storage provisioning, and monitoring the health and performance of the system. The DS manager 430 may comprise a physical device (e.g., a computer device such as computer system/server 12 of FIG. 1), a virtual machine (VM), or a container (e.g., a Docker container). The term "Docker" may be subject to trademark rights in various jurisdictions throughout the world and is used here only in reference to the products or services properly denominated by the mark to the extent that such trademark rights may exist.

According to aspects of the invention, the DS processing units 410 are configured to encrypt and encode data during a write operation, to manage the dispersal of slices of data during a write operation, and to decode and decrypt data during a read operation. In embodiments, the DS processing units 410 are stateless components that present a storage interface to a client application and that transform data objects into slices using an IDA. Each DS processing unit 410 may comprise a physical device (e.g., a computer device such as a computer system/server 12 of FIG. 1), a virtual machine (VM), or a container (e.g., a Docker container).

According to aspects of the invention, the DS units 420 are configured to store the data slices that are received from a DS processing unit 410 during a write, and to return data slices to a DS processing unit 410 during a read. Each DS unit 420 comprises a physical device, e.g., a computer storage device such as the storage system 34 of FIG. 1.

In implementations, a client device 450 runs a client application that communicates with one of the DS processing units 410 to perform data operations in the DSN 400. In embodiments, the client application uses application programming interfaces (APIs) to perform data operations in the DSN 400. In one example, a first API call (e.g., PUT) writes a data object to the DSN 400, a second API call (e.g., GET) reads a data object from the DSN 400, a third API call (e.g., DELETE) deletes a data object from the DSN 400, and a fourth API call (e.g., LIST) lists all the data objects in a bucket in the DSN 400. In embodiments, the client device 450 comprises a computer device such as a laptop computer, desktop computer, tablet computer, etc., and may comprise one or more components of the computer system/server 12 of FIG. 1. In embodiments, the client application running on the client device 450 is a software application, and may comprise one or more program modules 42 as described with respect to FIG. 1. In embodiments, the client device 450 communicates with one of the DS processing units 410 via the network 440.

In embodiments, a vault is a group of DS processing units 410 and DS units 420 in the DSN 400. A vault can be spread across plural DS units 420, and the DSN 400 may include plural different vaults. For example, the DSN 400 may include a first vault at a first geographic location (e.g., Texas), and a second vault at a second geographic location (e.g., Germany). In embodiments, a bucket is a logical storage unit of a vault. As used herein, a bucket is a group of objects stored in a vault that share a same namespace within the vault, where the namespace is an address structure used to identify objects in the system. A vault can have plural different buckets (and, therefore, plural different namespaces). Each bucket stores one or more objects, e.g., as plural slices in various ones of the DS units 420 in the vault.

According to aspects of the invention, each bucket may have one or more object lifecycle management (OLM) rules that define certain actions to perform on objects in the bucket when certain conditions are satisfied. In embodiments, the DSN 400 has an OLM front-end comprising an API that the client application running on the client device 450 calls to define OLM rules for a bucket. As used herein, a rule that is associated with a bucket (also referred to as a bucket rule, an OLM rule, or simply a rule) is a data structure that defines a prescribed action for the DSN 400 to perform on an object in the bucket when metadata associated with the object satisfies a condition defined in the rule. Conditions defined in a rule may include but are not limited to one or more of: matching prefixes; matching suffixes; the object being older than a predefined age; a calendar date having been reached;

the object was created during a specific date range; and the amount of space utilized has reached or exceeded a threshold amount. Actions defined in a rule may include but are not limited to one or more of: deleting an object from the DSN 400; moving an object to a different storage medium within the DSN 400; and moving an object to a different storage system outside the DSN 400. For example, a rule associated with a particular bucket might specify that any object (in the bucket) that is older than 6 months is deleted. As another example, a rule may specify that all data objects (in the bucket) that begin with the prefix "/merger" is moved to a different tier of storage after a date defined by the rule. These examples are not limiting, and different rules may be used.

In embodiments, the DSN 400 includes an OLM back-end comprising plural Producer Consumer Scheduler Framework (PCSF) bundles that are configured to perform a four stage process comprising: (i) identify all the buckets within a vault that have a rule, and generate a first leasable index including work items corresponding to these buckets; (ii) for each work item in the first leasable index, divide the namespace of the bucket into ranges of object names of approximately equal size, and add these ranges as work items to a second leasable index; (iii) for each work item in the second leasable index, analyze the object metadata of each object in the range to identify objects that satisfy the rule associated with this bucket, and add the identified objects as work items to a third leasable index; and (iv) for each work item in the third leasable index, perform the action specified by the rule associated with this bucket on the object of this work item.

Figure 5:
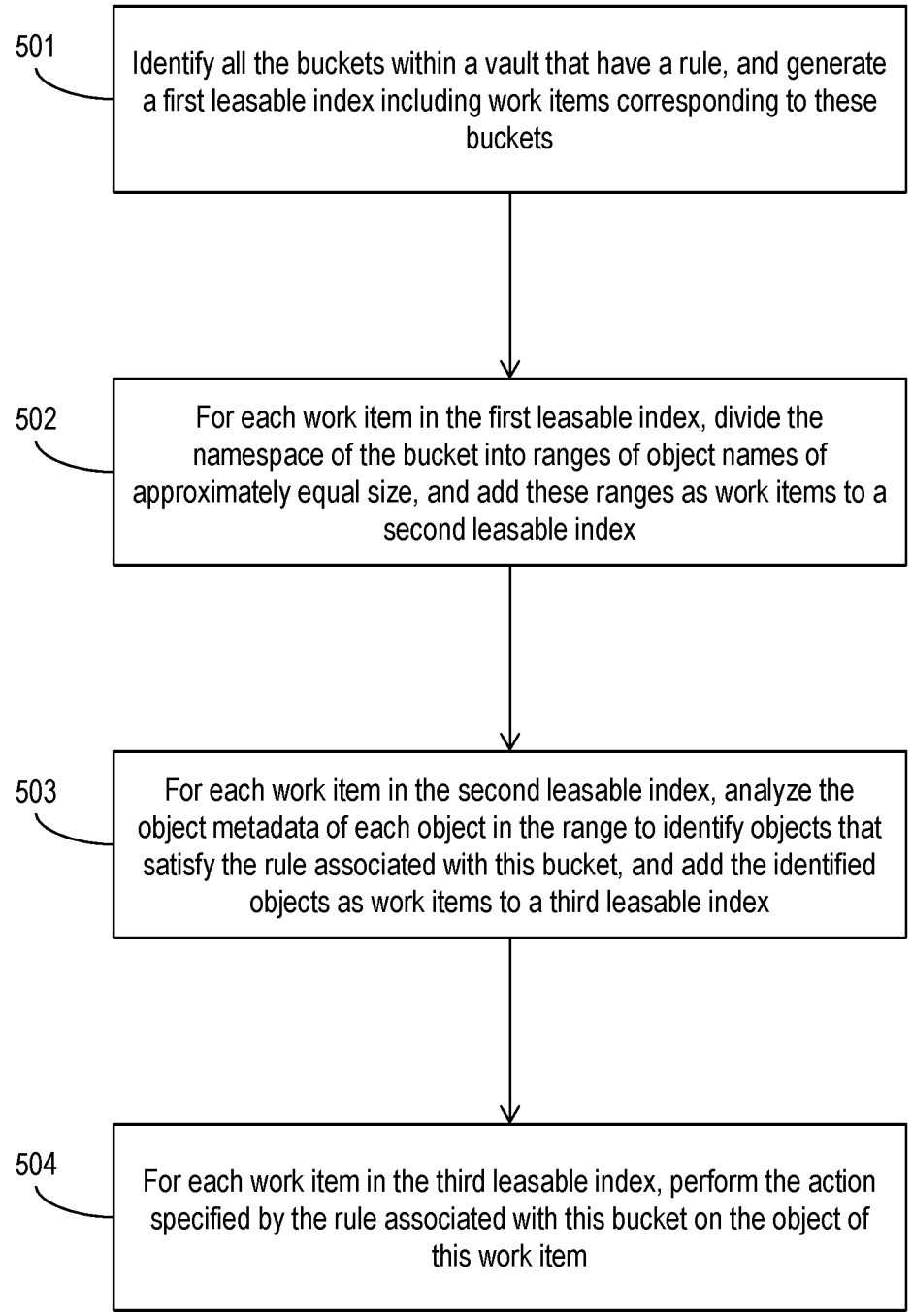
FIG. 5 shows a flowchart of an exemplary method in accordance with aspects of the invention.

This four stage process is illustrated in a flowchart in FIG. 5 with the steps numbered as 501-504. In embodiments, various ones of the DS processing units 410 run PCSF bundles that perform steps 501-504. In a particular embodiment, a single one of the DS processing units 410 in the DSN 400 performs step 501 to generate a respective first leasable index for each respective vault in the DSN 400. Then, in response to receiving the respective first leasable index for a respective vault, any of plural ones of the DS processing units 410 in that respective vault perform steps 502, 503, and 504 on identified ones of the buckets in that vault. In embodiments, step 501 is performed for each vault on a predefined interval, such as once per day. However, implementations are not limited to this interval, and other intervals may be used.

As used herein, a leasable index is a data structure that contains a queue of work items, where plural DS processing units 410 act in parallel to lease individual ones of the work items and process the leased work items. In embodiments, when a first DS processing unit 410 leases a work item from a leasable index, that work item is marked as "leased" in the leasable index, which prevents a second one of the DS processing units 410 from leasing and working on this same work item at the same time as the first DS processing unit 410. If the first DS processing unit 410 completes the processing of this work item within a predefined amount of time, then this work item is deleted from the leasable index. On the other hand, if the first DS processing unit 410 does not complete the processing on this work item within the predefined amount of time, then the lease for this work item expires in the leasable index, which means that another DS processing unit 410 can now lease this work item from the leasable index. In this manner, plural DS processing units 410 work in parallel to lease and process respective ones of the work items from the leasable index. In implementations, the contents of the queue of a leasable index may be in a near constant state of flux, as new work items are added and existing work items are leased and deleted. In a particular embodiment, each leasable index used herein is a Dispersed Lockless Concurrent Index (DLCI).

Figure 6:
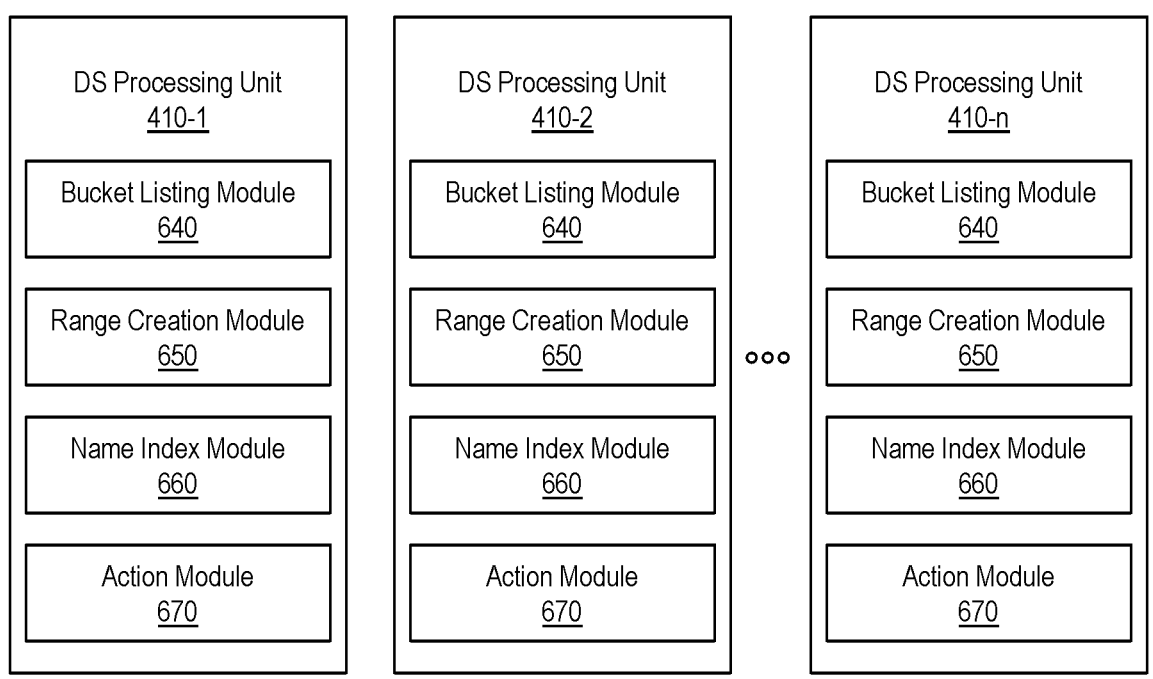
FIG. 6 shows a number of processing units associated with a vault in accordance with aspects of the invention.

FIG. 6 shows a number of DS processing units 410-1, 410-2, ..., 410-n associated with a vault in accordance with aspects of the invention. The number "n" may be any positive integer, and there may be any desired number of vaults in the entire DSN 400. In embodiments, and as shown in FIG. 6, each of the DS processing units 410-1, 410-2, ..., 410-n comprises: a bucket listing module 640 that is configured to perform some or all of step 501; a range creation module 650 that is configured to perform some or all of step 502; a name index module 660 that is configured to perform some or all of step 503; and an action module 670 that is configured to perform some or all of step 504. Each of the modules 640, 650, 660, and 670 may comprise one or more program modules 42 as described with respect to FIG. 1. In a particular embodiment described with respect to FIG. 7, each of the modules 640, 650, 660, and 670 comprises a bundle including one or more of a producer, a scheduler, and a consumer, each of which may comprise one or more program modules 42. In implementations, each of the DS processing units 410-1, 410-2, ..., 410-n is capable of performing each of steps 501-504, due to each of the DS processing units 410-1, 410-2, ..., 410-n having the same modules 640, 650, 660, and 670. In this manner, the DS processing units 410-1, 410-2, ..., 410-n are configured to work in parallel to process work items from the leasable indexes described herein.

Figure 7:
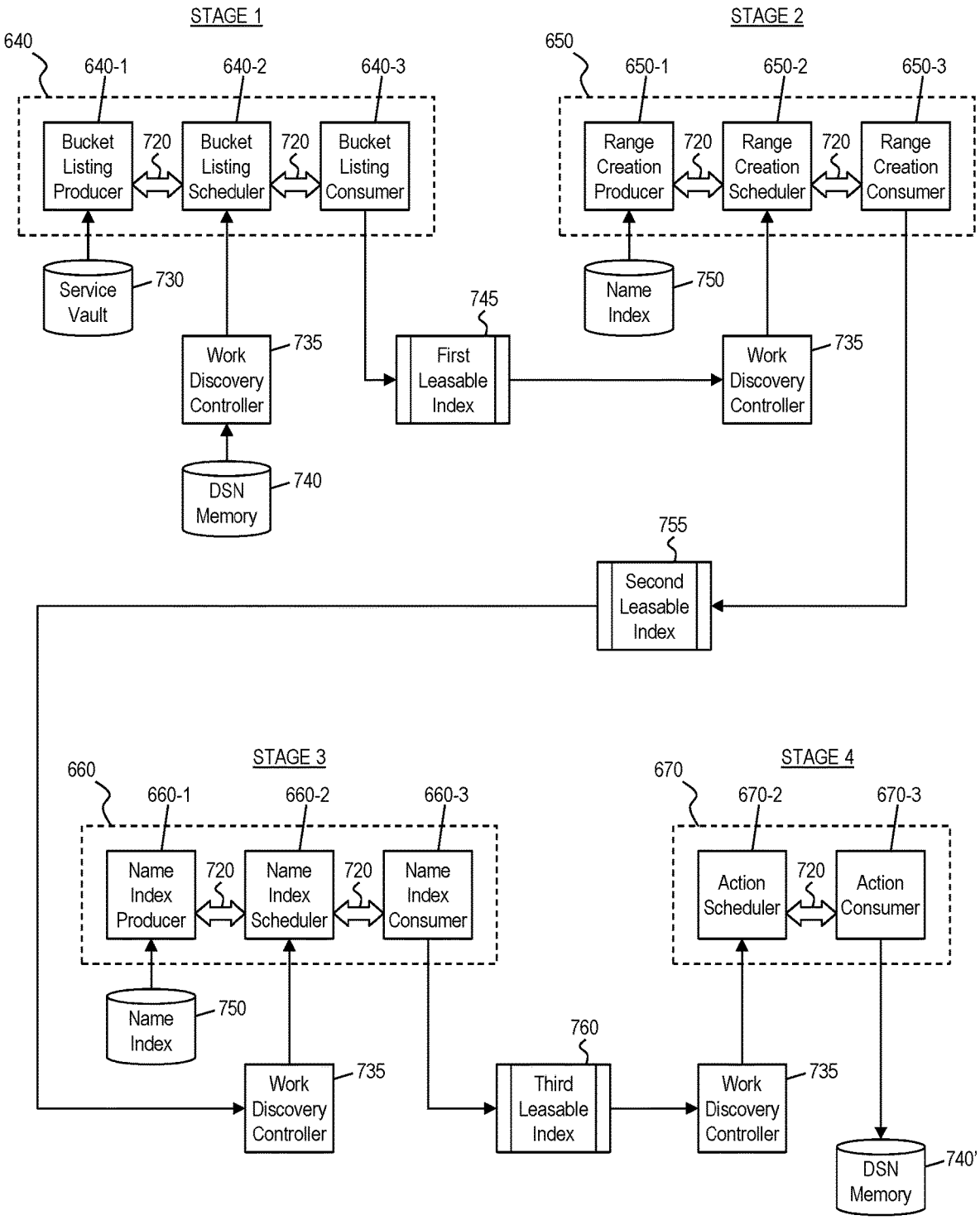
FIG. 7 shows a block diagram that illustrates an exemplary operation of a method in accordance with aspects of the invention.

FIG. 7 shows a block diagram that illustrates an exemplary operation of steps 501-504 of FIG. 5 performed by the modules 640, 650, 660, and 670 of various ones of the DS processing units 410-1, 410-2, ..., 410-n of FIG. 6. As shown in FIG. 7, in embodiments, the bucket listing module 640 of each DS processing unit 410-1, 410-2, ..., 410-n includes a PCSF bundle comprising a bucket listing producer 640-1, a bucket listing scheduler 640-2, and a bucket listing consumer 640-3, which communicate via asynchronous iterator 720. In embodiments, the range creation module 650 of each DS processing unit 410-1, 410-2, ..., 410-n includes a PCSF bundle comprising a range creation producer 650-1, a range creation scheduler 650-2, and a range creation consumer 650-3, which communicate via asynchronous iterator 720. In embodiments, the name index module 660 of each DS processing unit 410-1, 410-2, ..., 410-n includes a PCSF bundle comprising a name index producer 660-1, a name index scheduler 660-2, and a name index consumer 660-3, which communicate via asynchronous iterator 720. In embodiments, the action module 670 of each DS processing unit 410-1, 410-2, ..., 410-n includes a PCSF bundle comprising an action scheduler 660-2 and an action consumer 660-3, which communicate via asynchronous iterator 720.

In accordance with aspects of the invention, a work discovery controller 735 communicates with each of the modules 640, 650, 660, and 670 in the following manner. At stage 1, the work discovery controller 735 performs a process to select one of the DS processing units 410-1, 410-2, ..., 410-n to perform the steps of stage 1 (e.g., step 501). At stages 2-4 (e.g., steps 502-504), the work discovery controller 735 leases a work item from the upstream leasable index, passes that work item to the PCSF bundle, and deletes that work item from the upstream leasable index after the PCSF bundle successfully processes the work item. In embodiments, the work discovery controller 735 comprises one or more program modules 42 running on the DS manager 430 or another one of the nodes in the DSN 400.

According to aspects of the invention, stage 1 corresponds to step 501 and comprises the bucket listing producer 640-1 generating a list of all the buckets in the DSN 400. In embodiments, the bucket listing producer 640-1 generates the list from a container index stored in a service vault 730, which is a specialized namespace used to store data defining a configuration state of all the buckets in the DSN memory 740. The work discovery controller 735 obtains the bucket metadata from the DSN memory 740. In embodiments, the bucket metadata includes, amongst other things, data defining any OLM rules that the user has specified for this bucket. It is not necessary for all buckets will to have OLM rules, and the purpose of stage 1 is to determine which buckets do and which do not have an OLM rule. The bucket listing scheduler 640-2 passes the name of a bucket and the metadata of the same bucket to the bucket listing consumer 640-3, which determines whether this bucket has an OLM rule defined in its bucket metadata. In embodiments, the bucket listing consumer 640-3 is configured to make this determination based on the bucket metadata itself, for example, by determining that the bucket metadata includes a rule tag, or by determining that a pre-defined field in the metadata (that is reserved for an OLM rule) is populated. These examples are not intended to be limiting, and other techniques may be used to determine whether the bucket metadata of a particular bucket includes an OLM rule.

Still referring to stage 1, if the bucket does have an OLM rule defined in its bucket metadata, then the bucket listing consumer 640-3 adds this bucket name as a work item to the first leasable index 745. If the bucket does not have an OLM rule defined in its bucket metadata, then the bucket listing consumer 640-3 does not add this bucket name as a work item to the first leasable index 745. The bucket listing consumer 640-3 performs this process for each bucket in the list generated by the bucket listing producer 640-1 at a rate controlled by the bucket listing scheduler 640-2.

In a particular embodiment, the bucket listing module 640 on a single one of the DS processing units 410-1, 410-2, ..., 410-n performs step 501 for the entire DSN 400 according to a predefined schedule, e.g., once per day. In this manner, the DSN 400 initiates the process of checking buckets for OLM rules on a daily basis. In a particular embodiment in which the DSN 400 includes plural different vaults, step 501 comprises a single one of the DS processing units generating a respective first leasable index 745 for each respective one of the vaults. In this embodiment, each respective first leasable index 745 represents an index of buckets that are both in a particular vault and have an OLM rule.

With continued reference to the embodiment depicted in FIG. 7, stage 2 corresponds to step 502 and comprises the work discovery controller 735 leasing a work item from the first leasable index 745. The work item includes a name of a bucket (e.g., one of the buckets determined at stage 1 as having an OLM rule). The work discovery controller 735 passes the work item to the range creation module 650. The range creation producer 650-1 reads the name index 750 to determine the name of all objects in this particular bucket, and passes this list of names to the range creation consumer 650-3 via the range creation scheduler 650-2. In embodiments, the name index 750 comprises stored object names and object metadata. In embodiments, the name index 750 is a data structure that is sliced and stored like other data objects in the DSN 400.

Still referring to stage 2, the range creation consumer 650-3 divides the list of names into plural ranges having approximately equal numbers of object names in each range. In an exemplary implementation, the range creation consumer 650-3 determines the respective ranges of names of objects within a bucket using a namespace tree structure (of the namespace of the work item from the first leasable index) and an algorithm that includes parameters that are used to define the namespace tree structure. In embodiments, the namespace tree structure is a "B+ tree" data structure that is used internally by the DSN 400 (e.g., internally meaning it is not visible to the user at client device 450) to keep a record of objects in this namespace in order to perform listings (e.g., LIST) and lookups in an efficient manner. In this example, the algorithm does not guarantee that each range will have exactly a same number of object names; instead, the algorithm is specifically configured to approximate a same number of names in each of the plural ranges of names based on parameters (e.g., such as "split" and "join") that are used to define the namespace tree structure. Implementations of the invention are not limited to this particular method for creating ranges of names of objects in a bucket, and other methods may be used.

Still referring to stage 2, the range creation consumer 650-3 creates and adds work items to a second leasable index 755, wherein each work item includes: a bucket name; a name of a first object in the determined range; and a name of a last object in the determined range. In a particular exemplary embodiment, the range creation consumer 650-3 creates one work item (added to the second leasable index 755) for each three leaf nodes in the namespace tree structure of the namespace of one work item that it processes from the first leasable index 745. In this example, plural work items are typically created and added to the second leasable index 755 for each one work item from the first leasable index 745, with each of the created work items including a respective range of object names of objects in this bucket (e.g., a first work item contains a range of object names that begin with A through D, a second work item contains a range of object names that begin with E through P, a the third work item contains a range of object names that begin with Q through Z), and where each of the ranges contains approximately a same number of object names. After the range creation consumer 650-3 successfully processes a work item from the first leasable index 745 in this manner, the work discovery controller 735 then deletes this work item from the first leasable index 745. As described herein, in embodiments, plural different DS processing units perform this processing in parallel on plural different work items from the first leasable index 745.

With continued reference to the embodiment depicted in FIG. 7, stage 3 corresponds to step 503 and comprises the work discovery controller 735 leasing a work item from the second leasable index 755. The work item includes the name of a bucket, the name of a first object in a range in this bucket, and the name of a last object in the same range (the range having been determined in stage 2). The work discovery controller 735 passes the work item to the name index module 660. The name index scheduler 660-2 instructs the name index producer 660-1 to obtain the metadata of all the objects defined by the range in this work item. The name index producer 660-1 accesses the name index 750 and obtains the metadata of all the objects defined by the range in this work item, and passes this object metadata and the bucket rules (for the bucket containing this object) to the name index consumer 660-3. In embodiments, the object metadata is stored in the name index 750 as opposed to being stored with the objects themselves. This increases the speed at which the object metadata is obtained and utilized in processes described herein.

Still referring to stage 3, the name index consumer 660-3 analyzes the object metadata for each object to determine whether this object satisfies the OLM rule for this bucket. In particular, the name index consumer 660-3 compares the object name and the object metadata to the rule and, based on this comparison, determines whether the object satisfies the rule. For example, the rule might specify deleting data that is more than six months old, and the object metadata may indicate that the object is more than six months old. In this example, the name index consumer 660-3 would determine that the object satisfies the rule.

Still referring to stage 3, if the object satisfies the rule, then the name index consumer 660-3 adds the object name as a work item to the third leasable index 760. If the object does not satisfy the rule, then the name index consumer 660-3 does not add the object name as a work item to the third leasable index 760. This bundle repeats this process for each object in the range of this work item from the second leasable index 755. The work discovery controller 735 then deletes this work item from the second leasable index 755. As described herein, in embodiments, plural different DS processing units perform this processing in parallel on plural different work items from the second leasable index 755.

With continued reference to the embodiment depicted in FIG. 7, stage 4 corresponds to step 504 and comprises the work discovery controller 735 leasing a work item from the third leasable index 760. The work item includes the name of an object (e.g., one of the objects determined in stage 3 as satisfying the OLM rule of its bucket). The work discovery controller 735 passes the name of the object to the action module 670. The action scheduler 670-2 passes the name of the object to the action consumer 670-3 in accordance with a predefined schedule (e.g., rate of processing objects). The action consumer 670-3 then performs the action specified by the OLM rule of the bucket that contains this object. Continuing the example of the rule that specifies deleting data that is more than six months old, the action consumer 670-3 deletes this object from the DSN memory 740. This may comprise, for example, deleting all the slices of this object that are stored in any of the DS units 420 in the DSN 400. Implementations of the invention are not limited to deleting data objects, and other actions may be performed by the action consumer 670-3, such as moving data objects to other types of storage (e.g., different than the DSN 400), moving data objects to other tiers within the DSN 400, etc., as defined by the OLM rule of the bucket that contains the data object. After the action consumer 670-3 successfully processes a work item from the third leasable index 760 in this manner, the work discovery controller 735 then deletes this work item from the third leasable index 760. As described herein, in embodiments, plural different DS processing units perform this processing in parallel on plural different work items from the third leasable index 760.

As described herein, different bucket rules may define different actions, e.g., delete, move, etc. In a particular exemplary embodiment, the system includes plural different third leasable indexes 760, one respective third leasable index 760 for each respective action. In this example, there may also be plural different action consumers 670-3, each respective one configured to perform the respective action associated with a respective one of the plural different third leasable indexes 760.

Still referring to stage 4, in a particular exemplary embodiment, the action consumer 670-3 revalidates the object metadata against the OLM rule of the bucket prior to performing the action specified by the OLM rule. This optional step accounts for the fact that the user may have changed the OLM rule for this bucket (e.g., via input to the client device 450) in a time period between stage 3 and stage 4, and advantageously double checks that the object still satisfies the rule before processing the object according to the rule.

Still referring to stage 4, in another particular exemplary embodiment, the system runs stages 1-3 on a first day, and runs stage 4 for the objects identified in stages 1-3 on a next day immediately after the first day. In this embodiment, the work items in the third leasable index 760 each include a date on which the action bundle should process the work item. In this manner, the action bundle (i.e., at stage 4) only processes work items that are ready according to the date included in the work items. An even further optional step in this exemplary embodiment is to define a configurable amount of time where the scanning bundles (e.g., stages 1-3) skip work that should have already been discovered (e.g., work which may be pending in the queues of the action bundles). This optimization eliminates adding duplicate work to the action bundle queues.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   identifying by a first program module, a bucket of objects having an object lifecycle management rule in a dispersed storage network;
   adding the bucket of objects having the object lifecycle management rule to a first leasable index, the bucket comprising a work item;

creating, by a second program module, ranges of object names included in a namespace of the bucket of objects identified as the work item in the first leasable index;

adding each of the ranges of object names included in the namespace of the bucket to a second leasable index, each of the ranges of object names comprising a plurality of work items;

determining, by a third program module and for respective objects in each of the ranges created as the plurality of work items in the second leasable index, whether the respective objects satisfy the object lifecycle management rule, wherein the determining comprises comparing object metadata of the respective objects to the object lifecycle management rule;

adding each of the respective objects that satisfy the object lifecycle management rule to a third leasable index, each of the respective objects comprising another plurality of work items; and performing, by a fourth program module, a command comprising an action on one of the respective objects of the another plurality of work items in the third leasable index that satisfies the object lifecycle management rule, the action being defined by the object lifecycle management rule, wherein the performing the command comprises revalidating that the one of the respective objects satisfies the object lifecycle management rule prior to performing the action, wherein the dispersed storage network comprises plural dispersed storage processing units each including a copy of the first program module, a copy of the second program module, a copy of the third program module, and a copy of the fourth program module;

the creating the ranges, the determining, and the performing the action are performed by any one of the plural dispersed storage processing units according to each of the first leasable index, the second leasable index, and the third leasable index generated in the dispersed storage network;

each of the first leasable index, the second leasable index, and the third leasable index is a data structure that contains a queue of plural work items, where the plural dispersed storage processing units act in parallel to process the plural work items leased from each of the first leasable index, the second leasable index, and the third leasable index; and when a first one of the plural dispersed storage processing units leases one of the plural work items from any of the first leasable index, the second leasable index, or the third leasable index, the other ones of the plural dispersed storage processing units are prevented from leasing the one of the plural work items at the same time as the first one of the plural dispersed storage processing units.

2. The method of claim 1, wherein:
the comparing comprises, for each unverified object of the respective objects, validating a precondition for performing the action defined by the object lifecycle management rule comprising one selected from the group consisting of:
matching a name prefix of the unverified object;
the unverified object being older than a predefined age;
a calendar date having been reached;
the unverified object was created during a specific date range; and
the amount of space utilized by the unverified object has exceeded a predefined threshold.

3. The method of claim 2, wherein:
the creating the ranges of object names comprises determining names of all objects in the bucket by reading a name index;
the name index is a data structure that is sliced and stored in the dispersed storage network;
the object metadata is stored in the name index as opposed to being stored with the respective objects themselves; and
the comparing comprises obtaining the object metadata from the name index.

4. The method of claim 1, wherein the work item contains a name of the bucket.

5. The method of claim 4, wherein the second program module leases the work item from the first leasable index.

6. The method of claim 5, wherein the third program module leases one of the plurality of work items from the second leasable index.

7. The method of claim 6, wherein:
the fourth program module leases one of the respective objects of the another plurality of work items from the third leasable index; and
the third leasable index is one of plural different third leasable indexes, one respective third leasable index for each respective action.

8. The method of claim 1, wherein the bucket comprises a group of one or more data objects stored as slices in the dispersed storage network.

9. The method of claim 1, wherein the creating the ranges comprising dividing the namespace into the ranges using a namespace tree structure, wherein the namespace tree structure is a "B+ tree" data structure that is used internally by the dispersed storage network.

10. The method of claim 1, wherein:
the first program module comprises a first Producer Consumer Scheduler Framework (PCSF) bundle of program modules;
the second program module comprises a second PCSF bundle of program modules;
the third program module comprises a third PCSF bundle of program modules; and
the fourth program module comprises a fourth PCSF bundle of program modules.

11. The method of claim 1, wherein the action comprises one selected from the group consisting of:
deleting the one of the respective objects from the dispersed storage network;
moving the one of the respective objects to a different portion of the dispersed storage network; and
moving the one of the respective objects to a different storage outside the dispersed storage network.

12. The method of claim 1, wherein:
the identifying the bucket, the creating the ranges, and the determining are performed on a first day; and
the performing the action is performed on a second day immediately following the first day.

13. A computer program product, the computer program product comprising one or more computer readable storage media having program instructions collectively stored on the one or more computer readable storage media, the program instructions executable to:
generate a first leasable index comprising first work items of buckets of objects, wherein the generating is based on identifying the buckets of the objects that are in a dispersed storage network and that have an object lifecycle management rule;

generate a second leasable index comprising second work items of ranges of object names included in a namespace of the buckets of objects from the first leasable index, each including a name of one of the identified buckets and a range of the object names in the one of the identified buckets;

generate a third leasable index comprising third work items, each including a name of an object, from a respective one of the identified buckets, wherein the object satisfies the object lifecycle management rule of the respective one of the identified buckets, wherein the generating comprises comparing object metadata of the respective objects to the object lifecycle management rule of the respective one of the identified buckets; and for respective ones of the third work items, perform a command comprising an action on the object named in the respective one of the third work items, the action being defined by the object lifecycle management rule of the respective one of the identified buckets, wherein the performing the command comprises revalidating that the object named in the respective one of the third work items satisfies the object lifecycle management rule of the respective one of the identified buckets prior to performing the action being defined by the object lifecycle management rule, wherein each of the first leasable index, the second leasable index, and the third leasable index comprises a respective data structure that contains a queue of work items, where plural dispersed storage processing units in the dispersed storage network act in parallel to process the work items leased from each of the first leasable index, the second leasable index and the third leasable index; and when a first one of the plural dispersed storage processing units leases one of the work items from the first leasable index, the other ones of the plural dispersed storage processing units are prevented from leasing the one of the work items from the first leasable index at the same time as the first one of the plural dispersed storage processing units.

14. The computer program product of claim 13, wherein the action comprises one selected from the group consisting of:
deleting the object from the dispersed storage network;
moving the object to a different portion of the dispersed storage network; and
moving the object to a different storage outside the dispersed storage network.

15. The computer program product of claim 13, wherein:
the first leasable index, the second leasable index, and the third leasable index are generated on a first day; and
the performing the action is performed on a second day immediately following the first day.

16. The computer program product of claim 13, wherein:
each of the identified buckets comprises one or more data objects stored as slices in the dispersed storage network; and
each of the first leasable index, the second leasable index, and the third leasable index comprises a Dispersed Lockless Concurrent Index (DLCI).

17. The computer program product of claim 13, wherein the program instructions are executable to:
delete the one of the work items from the first leasable index in response to the first one of the plural dispersed storage processing units completing processing of the one of the work items within a predefined amount of time; and
expire a lease for the one of the work items from the first leasable index in response to the first one of the plural dispersed storage processing units not completing processing of the one of the work items within the predefined amount of time.

18. A system comprising:
a dispersed storage processing unit in a dispersed storage network, the dispersed storage processing unit comprising a processor, a computer readable memory, and one or more computer readable storage media;
program instructions to identify a bucket of objects having an object lifecycle management rule in the dispersed storage network;
program instructions to add the bucket of objects having the object lifecycle management rule to a first leasable index, the bucket comprising a work item;
program instructions to create ranges of object names included in a namespace of the bucket of objects identified as the work item in the first leasable index;
program instructions to add each of the ranges of object names included in the namespace of the bucket to a second leasable index, each of the ranges of object names comprising a plurality of work items;
program instructions to compare, for each object in each of the ranges, object metadata to the object lifecycle management rule of the bucket; and
program instructions to perform a command, based on the comparing, comprising an action on one of the objects among another plurality of work items generated in a third leasable index that satisfies the object lifecycle management rule, the action being defined by the object lifecycle management rule,
wherein the performing the command comprises revalidating that the one of the objects among another plurality of work items satisfies the object lifecycle management rule of the bucket prior to performing the action,
wherein the dispersed storage processing unit is one of plural dispersed storage processing units in the dispersed storage network, where the plural dispersed storage processing units in the dispersed storage network act in parallel to process the work items leased from each of the first leasable index, the second leasable index, and the third leasable index;
each of the plural dispersed storage processing units is configured to perform the creating the ranges, the comparing the object metadata, and the performing the action according to each of the first leasable index, the second leasable index, and the third leasable index generated in the dispersed storage network;
each of the first leasable index, the second leasable index, and the third leasable index is a data structure that contains a queue of plural work items and is configured such that when a first one of the plural dispersed storage processing units leases one of the plural work items from any of the first leasable index, the second leasable index, or the third leasable index, the other ones of the plural dispersed storage processing units are prevented from leasing the one of the plural work items at the same time as the first one of the plural dispersed storage processing units; and
the program instructions are collectively stored on the one or more computer readable storage media for execution by the processor via the computer readable memory.

19. The system of claim 18, wherein:
- the bucket comprises one or more data objects stored as slices in the dispersed storage network; and
- each of the at least one leasable index comprises a Dispersed Lockless Concurrent Index (DLCI).

20. The system of claim 18, wherein the action comprises one selected from the group consisting of:
- deleting the one of the objects from the dispersed storage network;
- moving the one of the objects to a different portion of the dispersed storage network; and
- moving the to a different storage outside the dispersed storage network.

* * * * *